United States Patent
Nam et al.

(10) Patent No.: US 11,418,306 B2
(45) Date of Patent: Aug. 16, 2022

(54) CHANNEL STATE INFORMATION REFERENCE SIGNAL (CSI-RS) FOR MULTIPLE BEAM TRANSMISSIONS

(71) Applicant: QUALCOMM Incorporated, San Diego, CA (US)

(72) Inventors: Wooseok Nam, San Diego, CA (US); Mostafa Khoshnevisan, San Diego, CA (US); Tao Luo, San Diego, CA (US); Jing Sun, San Diego, CA (US); Xiaoxia Zhang, San Diego, CA (US); Sungwoo Park, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 17/167,917

(22) Filed: Feb. 4, 2021

(65) Prior Publication Data

US 2021/0250144 A1    Aug. 12, 2021

Related U.S. Application Data

(60) Provisional application No. 62/971,851, filed on Feb. 7, 2020.

(51) Int. Cl.
*H04L 5/00* (2006.01)
*H04W 72/04* (2009.01)

(52) U.S. Cl.
CPC .......... *H04L 5/0048* (2013.01); *H04L 5/0057* (2013.01); *H04W 72/042* (2013.01)

(58) Field of Classification Search
CPC ... H04L 5/0048; H04L 5/0057; H04W 72/042
See application file for complete search history.

(56) References Cited

U.S. PATENT DOCUMENTS

2018/0343653 A1\* 11/2018 Guo ................ H04W 72/1273

OTHER PUBLICATIONS

"3rd Generation Partnership Project; Technical Specification Group Radio Access Network; NR; Physical Layer Procedures for Data (Release 16)", 3GPP TS 38.214, 3rd Generation Partnership Project (3GPP), Mobile Competence Centre, 650, Route Des Lucioles, F-06921, Sophia-Antipolis Cedex, France, vol. RAN WG1, No. V16.0.0, Dec. 2019, Jan. 14, 2020, 147 pgs, XP051860777, http://ftp.3gpp.org/Specs/archive/38_series/38.214/38214-g00.zip38214-g00.

International Search Report and Written Opinion—PCT/US2021/016880—ISA/EPO—Apr. 16, 2021.

(Continued)

*Primary Examiner* — Ronald B Abelson
(74) *Attorney, Agent, or Firm* — Qualcomm Incorporated

(57) ABSTRACT

Certain aspects of the present disclosure provide techniques for channel state information reference signal (CSI-RS) for multiple beam transmissions. In an example, a first CSI-RS triggering state of one or more CSI-RS triggering states indicates a CSI-RS resource set and associated transmission configuration indication (TCI) states. The CSI-RS resource set includes a plurality of CSI-RS resources. Each CSI-RS resource of the plurality of CSI-RS resources is associated with one or more corresponding TCI states as indicated by the first CSI-RS triggering state. A first CSI-RS resource of the plurality of CSI-RS resources is associated with a first plurality of TCI states as indicated by the first CSI-RS triggering state.

30 Claims, 11 Drawing Sheets

(56) References Cited

OTHER PUBLICATIONS

Qualcomm: "Summary of Beam Mgmt", 3GPPTSG RAN WG1 Meeting #91, 3GPP Draft; R1-1721696 Summary of Beam Mgmt, 3rd Generation Partnership Project (3GPP), Mobile Competence Centre; 650, Route Des Lucioles; F-06921 Sophia-Antipolis Cedex; France, vol. RAN WG1, no. Reno, USA; Nov. 27, 2017-Dec. 1, 2017, Dec. 4, 2017, XP051370775, 14 Pages, http://www.3gpp.org/ftp/tsg%5Fran/WG1%5FRL1/TSGR1%5F91/Docs/ [retrieved on Dec. 4, 2017] Sections 2.2-2.4 and 2.7, paragraphs [02.2], [02.6], [2.11].

* cited by examiner

TCI State Configuration

| Index | |
|---|---|
| 0 | CSI-RS or SSB ID, QCL Type |
| 1 | CSI-RS or SSB ID, QCL Type |
| ⋮ | ⋮ |

FIG. 7A

Active TCI States

| Index | |
|---|---|
| 0 | $TCI_0$ |
| 1 | $(TCI_{1\_0}, TCI_{1\_1})$ |
| ⋮ | ⋮ |

FIG. 7B

TCI State Configuration

| Index | |
|---|---|
| 0 | CSI-RS or SSB ID, QCL Type |
| 1 | CSI-RS or SSB ID, QCL Type |
| ⋮ | ⋮ |

Triggering States

| Index | |
|---|---|
| 0 | CSI-RS ID$_0$, {TCI$_{0,0}$, TCI$_{0,1}$, TCI$_{0,2}$,...} |
| 1 | CSI-RS ID$_1$, {TCI$_{1,0}$, TCI$_{1,1}$, TCI$_{1,2}$,...} |
| ⋮ | ⋮ |

FIG. 8A

TCI State Configuration

| Index | |
|---|---|
| 0 | CSI-RS or SSB ID, QCL Type |
| 1 | CSI-RS or SSB ID, QCL Type |
| ⋮ | ⋮ |

Triggering States

| Index | |
|---|---|
| 0 | CSI-RS ID$_0$, {TCI$_{0,0}$, (TCI$_{0,1,0}$, TCI$_{0,1,1}$), TCI$_{0,2}$,...} |
| 1 | CSI-RS ID$_1$, {TCI$_{1,0}$, TCI$_{1,1}$, TCI$_{1,2}$,...} |
| ⋮ | ⋮ |

FIG. 8B

Active TCI States

| Index | |
|---|---|
| 0 | TCI$_0$ |
| 1 | (TCI$_{1\_0}$, TCI$_{1\_1}$) |
| ⋮ | ⋮ |

Triggering States

| Index | |
|---|---|
| 0 | CSI-RS ID$_0$, {TCI$_{0,0}$, ATCI$_{0,1}$, TCI$_{0,2}$,...} |
| 1 | CSI-RS ID$_1$, {TCI$_{1,0}$, TCI$_{1,1}$, TCI$_{1,2}$,...} |
| ⋮ | ⋮ |

FIG. 8C

CHANNEL STATE INFORMATION REFERENCE SIGNAL (CSI-RS) FOR MULTIPLE BEAM TRANSMISSIONS

CROSS-REFERENCE TO RELATED APPLICATIONS

This application claims benefit of and priority to U.S. Provisional Patent Application No. 62/971,851, filed Feb. 7, 2020, which is assigned to the assignee hereof and herein incorporated by reference in its entirety as if fully set forth below and for all applicable purposes.

BACKGROUND

Field of the Disclosure

Aspects of the present disclosure relate to wireless communications, and more particularly, to techniques for multiple beam transmissions.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved multiple beam communication.

Certain aspects of the subject matter described in this disclosure can be implemented in a method for wireless communication by a user equipment (UE). The method generally includes receiving a configuration of one or more channel state information reference signal (CSI-RS) triggering states. A first CSI-RS triggering state of the one or more CSI-RS triggering states indicates a CSI-RS resource set and associated transmission configuration indication (TCI) states. The CSI-RS resource set comprises a plurality of CSI-RS resources. Each CSI-RS resource of the plurality of CSI-RS resources is associated with one or more corresponding TCI states as indicated by the first CSI-RS triggering state. A first CSI-RS resource of the plurality of CSI-RS resources is associated with a first plurality of TCI states as indicated by the first CSI-RS triggering state. The method further generally includes receiving a trigger for measurement of CS I-RS, the trigger indicating the first CSI-RS triggering state. The method further generally includes, based on receiving the trigger, measuring CSI-RS on the first CSI-RS resource using one or more receive parameters. The method further generally includes determining at least one receive parameter of the one or more receive parameters as associated with the first plurality of TCI states based on the measuring CSI-RS on the first CSI-RS resource. The method further generally includes receiving an indication of the first plurality of TCI states as associated with a downlink transmission. The method further generally includes receiving the downlink transmission using the at least one receive parameter based on the indication of the first plurality of TCI states and the first plurality of TCI states being associated with the at least one receive parameter.

Certain aspects of the subject matter described in this disclosure can be implemented in a method for wireless communication by a transmitter. The method generally includes transmitting a configuration of one or more channel state information reference signal (CSI-RS) triggering states. A first CSI-RS triggering state of the one or more CSI-RS triggering states indicates a CSI-RS resource set and associated transmission configuration indication (TCI) states. The CSI-RS resource set comprises a plurality of CSI-RS resources. Each CSI-RS resource of the plurality of CSI-RS resources is associated with one or more corresponding TCI states as indicated by the first CSI-RS triggering state. A first CSI-RS resource of the plurality of CSI-RS resources is associated with a first plurality of TCI states as indicated by the first CSI-RS triggering state. The method further generally includes transmitting a trigger for measurement of CSI-RS, the trigger indicating the first CSI-RS triggering state. The method further generally includes transmitting an indication of the first plurality of TCI states as associated with a downlink transmission. The method further generally includes transmitting the downlink transmission for a UE to receive using at least one receive parameter determined based on the indication of the first plurality of TCI states and the first plurality of TCI states being associated with the at least one receive parameter.

Certain aspects of the subject matter described in this disclosure can be implemented in a user equipment (UE) comprising a memory and a processor coupled to the memory. The memory and the processor are configured to receive a configuration of one or more channel state information reference signal (CSI-RS) triggering states. A first CSI-RS triggering state of the one or more CSI-RS triggering states indicates a CSI-RS resource set and associated transmission configuration indication (TCI) states. The CSI-RS resource set comprises a plurality of CSI-RS resources. Each CSI-RS resource of the plurality of CSI-RS resources is associated with one or more corresponding TCI states as indicated by the first CSI-RS triggering state. A first CSI-RS resource of the plurality of CSI-RS resources is associated with a first plurality of TCI states as indicated by the first CSI-RS triggering state. The memory and the processor are further configured to receive a trigger for measurement of CSI-RS, the trigger indicating the first CSI-RS triggering state. The memory and the processor are further configured to, based on receiving the trigger, measure CSI-RS on the first CSI-RS resource using one or more receive parameters. The memory and the processor are further configured to determine at least one receive parameter of the one or more receive parameters as associated with the first plurality of TCI states based on the measuring CSI-RS on the first CSI-RS resource. The memory and the processor are further configured to receive an indication of the first plurality of TCI states as associated with a downlink transmission. The memory and the processor are further configured to receive the downlink transmission using the at least one receive parameter based on the indication of the first plurality of TCI states and the first plurality of TCI states being associated with the at least one receive parameter.

Certain aspects of the subject matter described in this disclosure can be implemented in a transmitter comprising a memory and a processor coupled to the memory. The memory and the processor are configured to transmit a configuration of one or more channel state information reference signal (CSI-RS) triggering states. A first CSI-RS triggering state of the one or more CSI-RS triggering states indicates a CSI-RS resource set and associated transmission configuration indication (TCI) states. The CSI-RS resource set comprises a plurality of CSI-RS resources. Each CSI-RS resource of the plurality of CSI-RS resources is associated with one or more corresponding TCI states as indicated by the first CSI-RS triggering state. A first CSI-RS resource of the plurality of CSI-RS resources is associated with a first plurality of TCI states as indicated by the first CSI-RS triggering state. The memory and the processor are further configured to transmit a trigger for measurement of CSI-RS, the trigger indicating the first CSI-RS triggering state. The memory and the processor are further configured to transmit an indication of the first plurality of TCI states as associated with a downlink transmission. The memory and the processor are further configured to transmit the downlink transmission for a UE to receive using at least one receive parameter determined based on the indication of the first plurality of TCI states and the first plurality of TCI states being associated with the at least one receive parameter.

Certain aspects of the subject matter described in this disclosure can be implemented in a user equipment (UE). The UE generally includes means for receiving a configuration of one or more channel state information reference signal (CSI-RS) triggering states. A first CSI-RS triggering state of the one or more CSI-RS triggering states indicates a CSI-RS resource set and associated transmission configuration indication (TCI) states. The CSI-RS resource set comprises a plurality of CSI-RS resources. Each CSI-RS resource of the plurality of CSI-RS resources is associated with one or more corresponding TCI states as indicated by the first CSI-RS triggering state. A first CSI-RS resource of the plurality of CSI-RS resources is associated with a first plurality of TCI states as indicated by the first CSI-RS triggering state. The UE further generally includes means for receiving a trigger for measurement of CSI-RS, the trigger indicating the first CSI-RS triggering state. The UE further generally includes means for, based on receiving the trigger, measuring CSI-RS on the first CSI-RS resource using one or more receive parameters. The UE further generally includes means for determining at least one receive parameter of the one or more receive parameters as associated with the first plurality of TCI states based on the measuring CSI-RS on the first CSI-RS resource. The UE further generally includes means for receiving an indication of the first plurality of TCI states as associated with a downlink transmission. The UE further generally includes means for receiving the downlink transmission using the at least one receive parameter based on the indication of the first plurality of TCI states and the first plurality of TCI states being associated with the at least one receive parameter.

Certain aspects of the subject matter described in this disclosure can be implemented in a transmitter. The transmitter generally includes means for transmitting a configuration of one or more channel state information reference signal (CSI-RS) triggering states. A first CSI-RS triggering state of the one or more CSI-RS triggering states indicates a CSI-RS resource set and associated transmission configuration indication (TCI) states. The CSI-RS resource set comprises a plurality of CSI-RS resources. Each CSI-RS resource of the plurality of CSI-RS resources is associated with one or more corresponding TCI states as indicated by the first CSI-RS triggering state. A first CSI-RS resource of the plurality of CSI-RS resources is associated with a first plurality of TCI states as indicated by the first CSI-RS triggering state. The transmitter further generally includes means for transmitting a trigger for measurement of CSI-RS, the trigger indicating the first CSI-RS triggering state. The transmitter further generally includes means for transmitting an indication of the first plurality of TCI states as associated with a downlink transmission. The transmitter further generally includes means for transmitting the downlink transmission for a UE to receive using at least one receive parameter determined based on the indication of the first plurality of TCI states and the first plurality of TCI states being associated with the at least one receive parameter.

Certain aspects of the subject matter described in this disclosure can be implemented in a non-transitory computer-readable medium including instructions that when executed by a user equipment (UE), cause the UE to perform a method for wireless communication. The method generally includes receiving a configuration of one or more channel state information reference signal (CSI-RS) triggering states. A first CSI-RS triggering state of the one or more CSI-RS triggering states indicates a CSI-RS resource set and associated transmission configuration indication (TCI) states. The CSI-RS resource set comprises a plurality of CSI-RS resources. Each CSI-RS resource of the plurality of CSI-RS resources is associated with one or more corresponding TCI states as indicated by the first CSI-RS triggering state. A first CSI-RS resource of the plurality of CSI-RS resources is associated with a first plurality of TCI states as indicated by the first CSI-RS triggering state. The method further generally includes receiving a trigger for measurement of CSI-RS, the trigger indicating the first CSI-RS triggering state. The method further generally includes, based on receiving the trigger, measuring CSI-RS on the first CSI-RS resource using one or more receive parameters. The method further generally includes determining at least one receive parameter of the one or more receive parameters as associated with the first plurality of TCI states based on the measuring CSI-RS on the first CSI-RS resource. The method further generally includes receiving an indication of the first plurality of TCI states as associated with a downlink transmission. The method further generally includes receiving the downlink transmission using the at least one receive parameter based on the indication of the first plurality of TCI states and the first plurality of TCI states being associated with the at least one receive parameter.

Certain aspects of the subject matter described in this disclosure can be implemented in a non-transitory computer-readable medium including instructions that when executed by a transmitter, cause the transmitter to perform a method for wireless communication. The method generally includes transmitting a configuration of one or more channel state information reference signal (CSI-RS) triggering states. A first CSI-RS triggering state of the one or more CSI-RS triggering states indicates a CSI-RS resource set and associated transmission configuration indication (TCI) states. The CSI-RS resource set comprises a plurality of CSI-RS resources. Each CSI-RS resource of the plurality of CSI-RS resources is associated with one or more corresponding TCI states as indicated by the first CSI-RS triggering state. A first CSI-RS resource of the plurality of CSI-RS resources is associated with a first plurality of TCI states as indicated by the first CSI-RS triggering state. The method further generally includes transmitting a trigger for measurement of CSI-RS, the trigger indicating the first CSI-RS triggering state. The method further generally includes transmitting an indication of the first plurality of TCI states as associated with a downlink transmission. The method further generally includes transmitting the downlink transmission for a UE to receive using at least one receive parameter determined based on the indication of the first plurality of TCI states and the first plurality of TCI states being associated with the at least one receive parameter.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a BS.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7A illustrates a TCI state configuration of a UE, in accordance with certain aspects of the present disclosure.

FIG. 7B illustrates an active TCI state configuration of a UE, in accordance with certain aspects of the present disclosure.

FIGS. 8A-8C illustrate different examples or a CSI triggering state list of a UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
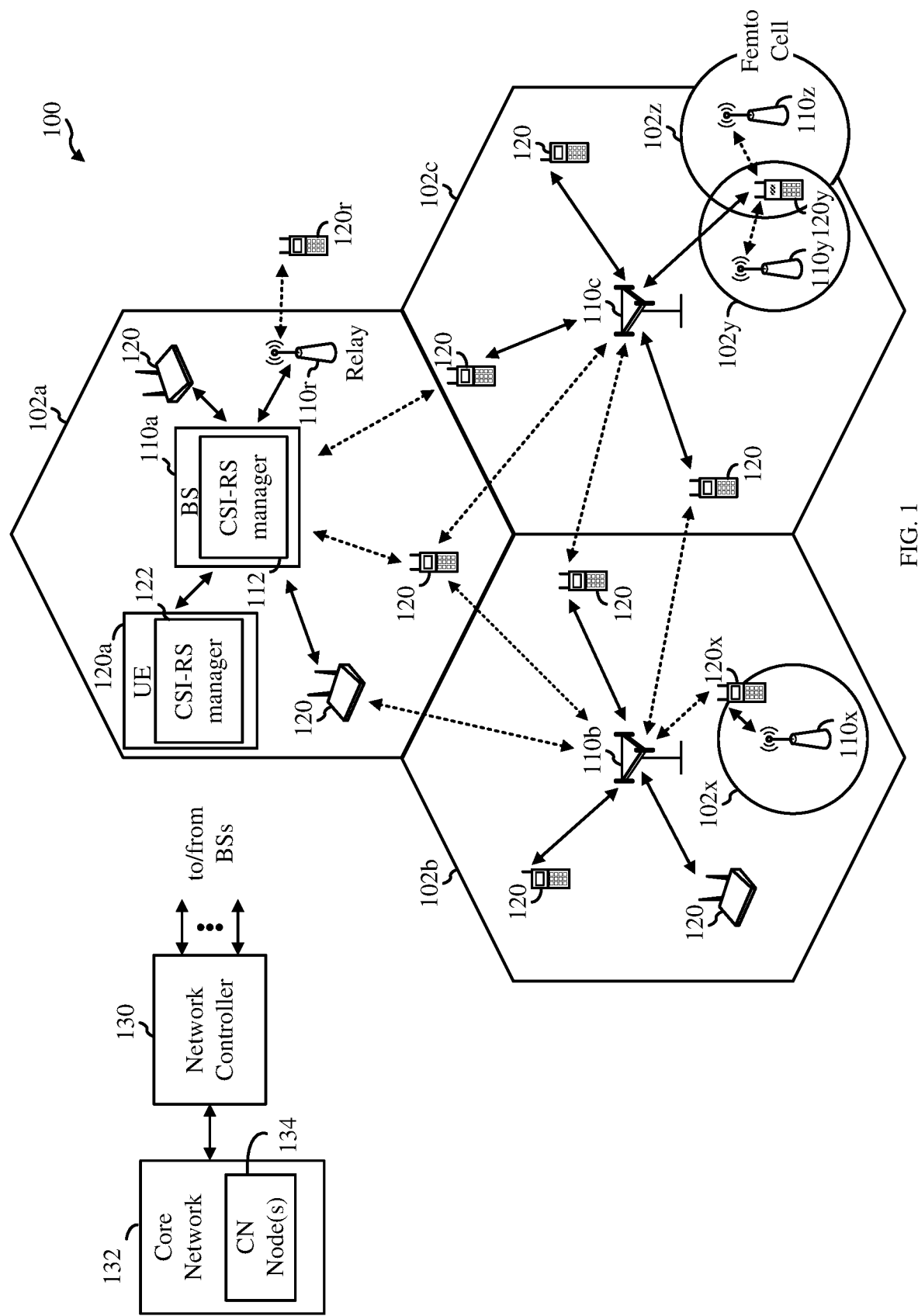
FIG. 1 is a block diagram conceptually illustrating an example telecommunications system, in accordance with certain aspects of the present disclosure.

Aspects of the present disclosure provide apparatus, methods, processing systems, and computer readable mediums for channel state information reference signal (CSI-RS) for multiple beam transmissions.

For example, in certain aspects a UE is configured to receive transmissions (e.g., control information, data, etc.) on multiple beams, which may be referred to as multi-beam or multiple beam transmissions. The multiple beam transmissions may be transmitted by multiple antenna modules or antenna arrays. For example, in certain aspects, each beam of the multiple beam transmissions is transmitted by a corresponding antenna module or antenna array.

In certain aspects, multiple beams (e.g., a subset, all, etc.) of the multiple beam transmission may be transmitted by a single transmitter (e.g., base station (BS), transmission reception point (TRP), distributed unit (DU), radiohead (RH), etc.). In certain such aspects, the single transmitter includes multiple antenna modules or antenna arrays. In certain aspects, different beams (e.g., a subset, all, etc.) of the multiple beam transmission are transmitted by different transmitters. For example, each transmitter may transmit one or more beams.

In certain aspects, multiple beam transmissions may refer to one or more of multiple beams multiplexed together or multiple beams transmitted as part of a single-frequency network (SFN) transmission. For example, multiple beams may be multiplexed together using one or more of space division multiplexing (SDM), time division multiplexing (TDM), or frequency division multiplexing (FDM). A SFN transmission may refer to the multiple beams being transmitted on a same time and frequency resource with a same waveform, modulation, coding, and scrambling as part of a SFN. In certain aspects, for SFN, the multiple beam transmissions may appear to the UE as a single transmission since the multiple beams may combine over the air.

In certain aspects, in order to receive a downlink transmission (e.g., control information, data, etc.), such as a multiple beam transmission from one or more transmitters, a UE may need to determine one or more receive beams of the UE to utilize to receive the downlink transmission. In certain aspects, the UE receives, on the downlink, control information (e.g., downlink control information (DCI)), that provides an indicator (e.g., indicator of a transmission configuration indication (TCI) state) to the UE of which one or more receive beams of the UE to utilize to receive the downlink transmission. For example, the indicator may be associated with a reference signal, such as a CSI-RS, that the UE has previously used for receive beam training at the UE. In particular, for beam training, the UE measures the reference signal using its receive beams, and may determine a particular one or more receive beams as associated with the reference signal, and accordingly the associated indicator, based on the measurement of the reference signal. For example, the UE determines the one or more receive beams as the one or more receive beams with adequate (e.g., above a threshold, the best, etc.) measured downlink channel quality (e.g., and in certain aspects a corresponding uplink channel quality) (e.g., reference signal received power (RSRP), a reference signal received quality (RSRQ), or signal-to-noise-plus-interference ratio (SINR)).

In certain cases, the UE may receive an indication of multiple TCI states for a single multiple beam transmission. Accordingly, certain aspects here provide techniques for associating a reference signal, such as CSI-RS (e.g., aperiodic CSI-RS), with multiple TCI states, such that the UE can perform receive beam training for the CSI-RS and associate the results with the combination of the multiple TCI states. Thus, the UE can use the one or more receive beams determined from the receive beam training for receiving downlink transmissions associated with the combination of the multiple TCI states.

The following description provides examples of CSI-RS for multiple beam transmissions in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. A network controller 130 may couple to a set of BSs 110 and provide coordination and control for these BSs 110 (e.g., via a backhaul).

The BSs 110 communicate with UEs 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for communicating CSI-RS for multiple beam transmissions. As shown in FIG. 1, the BS 110*a* includes a CSI-RS manager 112. The CSI-RS manager 112 may be configured to communicate CSI-RS for multiple beam transmissions, in accordance with aspects of the present disclosure. As shown in FIG. 1, the UE 120*a* includes a CSI-RS manager 122. The CSI-RS manager 122 may be configured to utilize CSI-RS for multiple beam transmissions, in accordance with aspects of the present disclosure.

Figure 2:
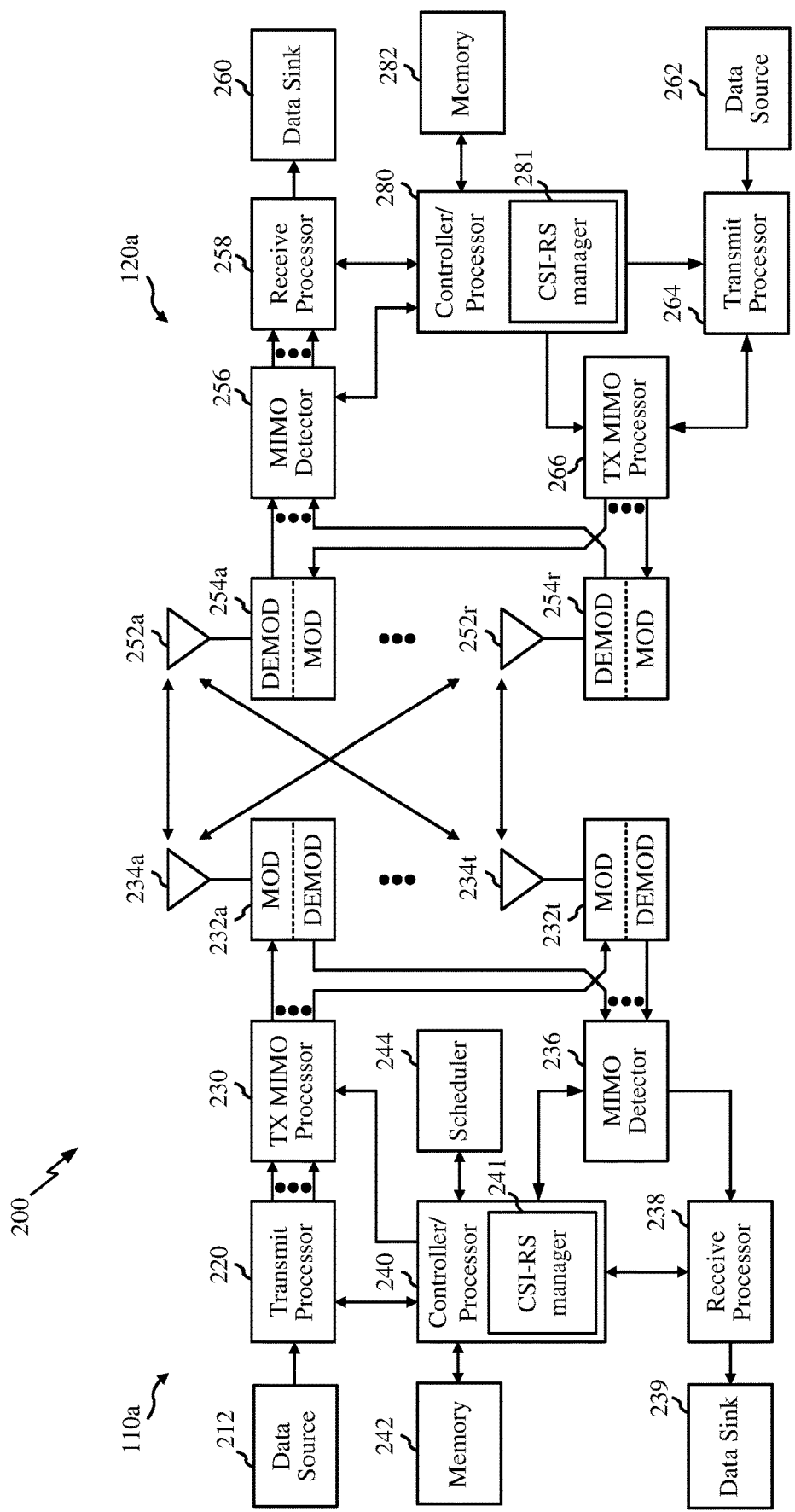
FIG. 2 is a block diagram conceptually illustrating a design of an example base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a CSI-RS manager 241 that may be configured for communicating CSI-RS for multiple beam transmissions, according to aspects described herein. As shown in FIG. 2, the controller/processor 280 of the UE 120a has a CSI-RS manager 281 that may be configured for utilizing CSI-RS for multiple beam transmissions, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
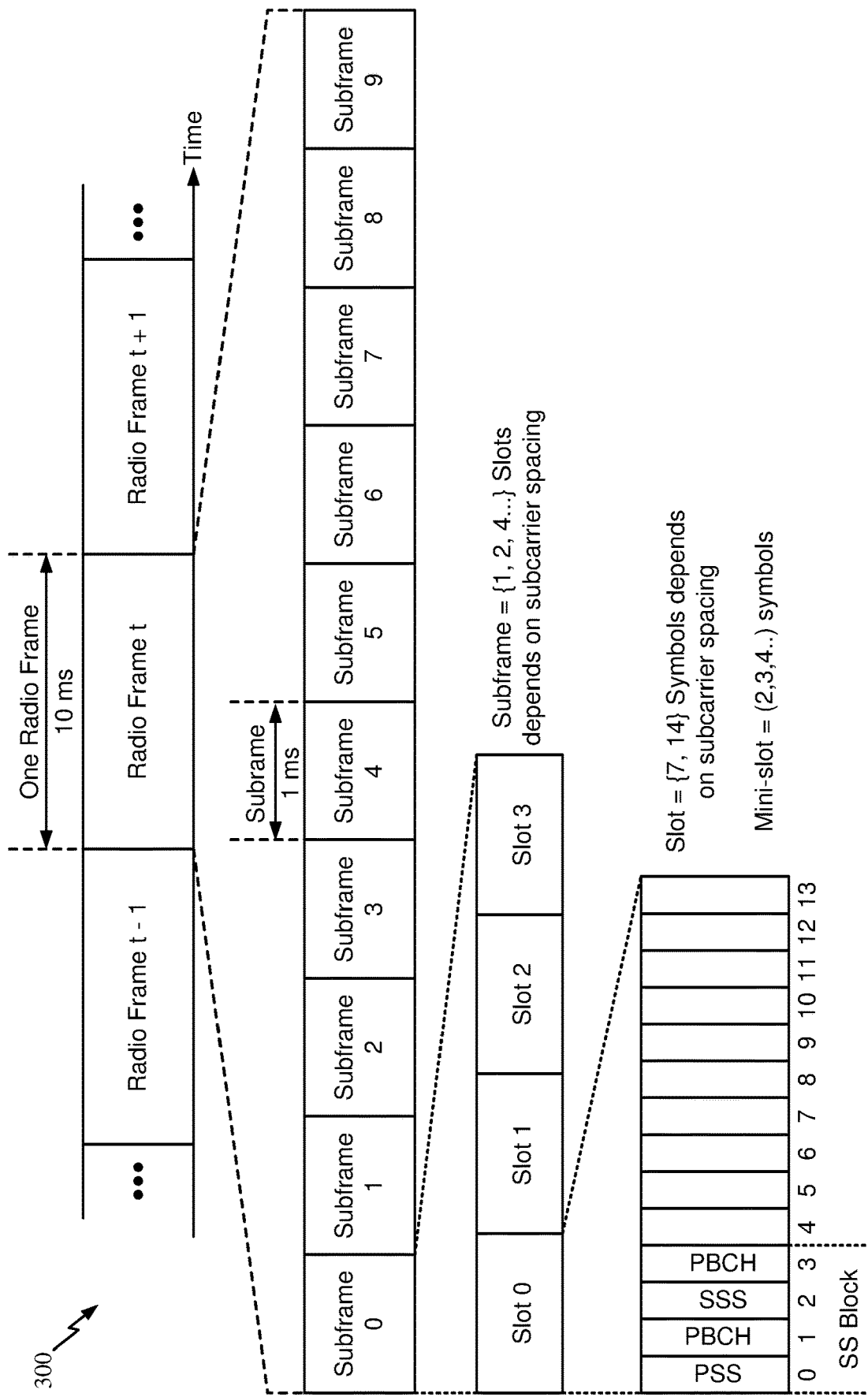
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Beamforming

Figure 4:
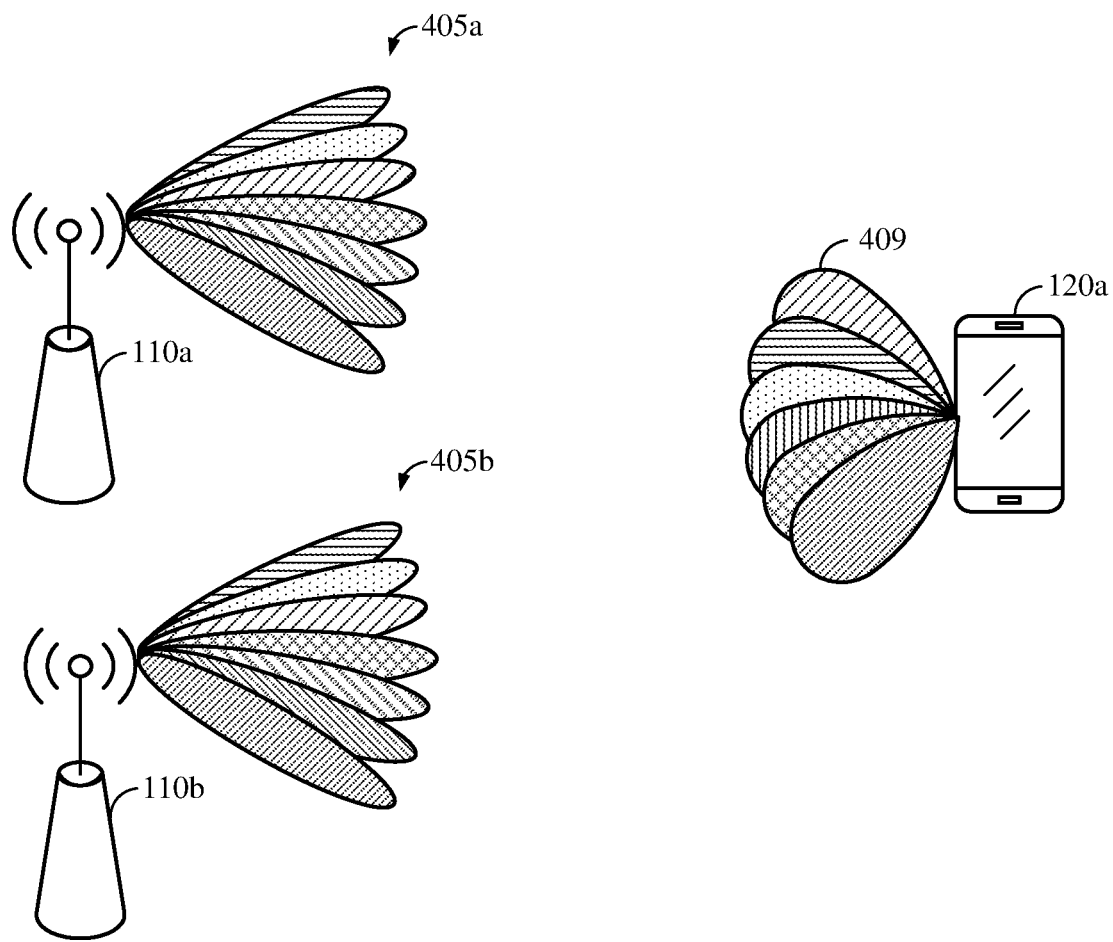
FIG. 4 illustrates example beamformed transmission by transmitters and beamformed reception by a UE, in accordance with certain aspects of the present disclosure.

FIG. 4 illustrates example beamformed transmission by transmitters (e.g., a first BS 110a and a second BS 110b of FIG. 1) and beamformed reception by a UE (e.g., UE 120a of FIG. 1). As shown, each of the first BS 110a and the second BS 110b transmits over a plurality of transmit beams 405a and 405b, respectively. Further, UE 120a receives over a plurality of receive beams 409.

QCL Port and TCI States

In many cases, it is important for a UE to know which assumptions it can make on a channel corresponding to different transmissions. For example, the UE may need to know which reference signals it can use to estimate the channel in order to decode a transmitted signal (e.g., PDCCH or PDSCH). It may also be important for the UE to be able to report relevant channel state information (CSI) to the BS (gNB) for scheduling, link adaptation, and/or beam management purposes. In NR, the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the DL RSs in one CSI-RS set and the PDSCH demodulation reference signal (DMRS) ports.

In some cases, a UE may be configured with up to M TCI-States. Configuration of the M TCI-States can come about via higher layer signalling, while a UE may be signalled to decode PDSCH according to a detected PDCCH with DCI indicating one of the TCI states. Each configured TCI state may include one RS set TCI-RS-SetConfig that indicates different QCL assumptions between certain source and target signals.

Figure 5:
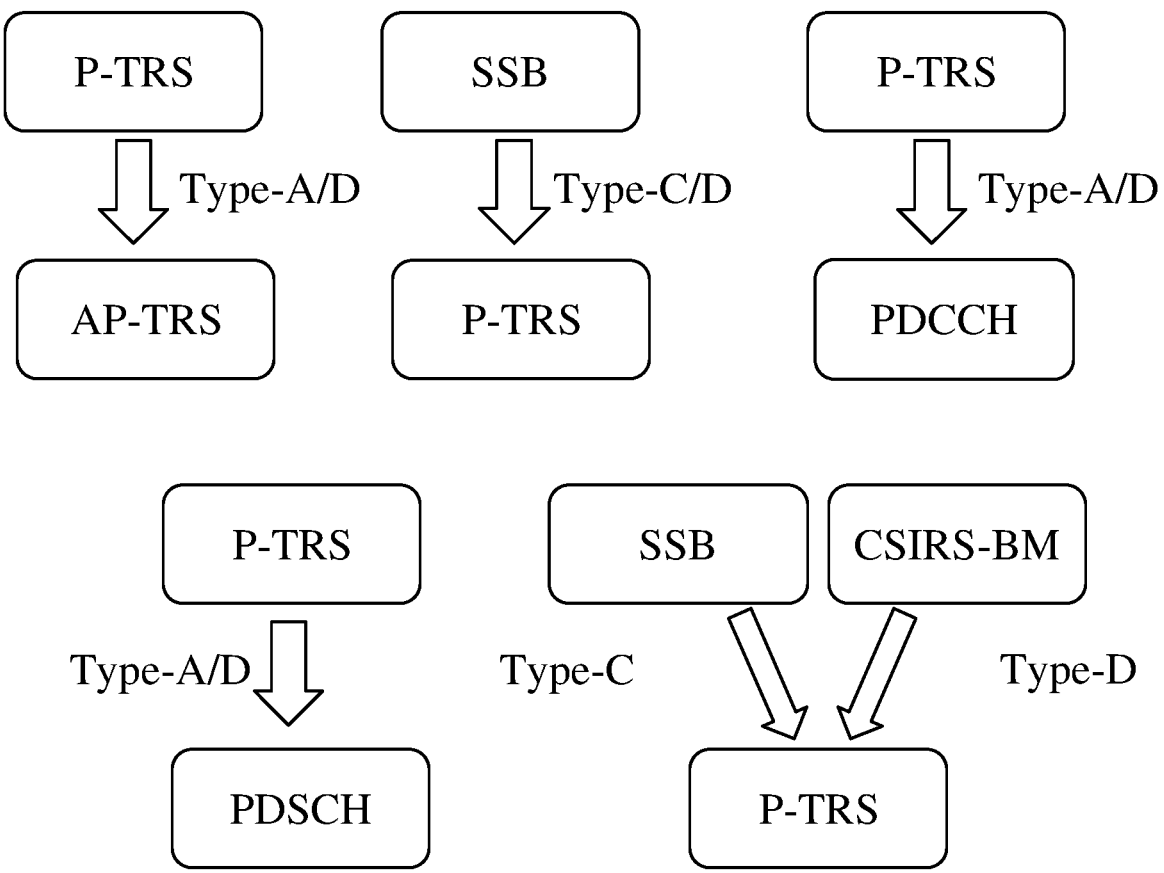
FIG. 5 illustrate examples of the association of downlink reference signals with corresponding quasi co-location types, in accordance with certain aspects of the present disclosure.

FIG. 5 illustrate examples of the association of DL reference signals with corresponding QCL types that may be indicated by a TCI-RS-SetConfig.

In the examples of FIG. 5, a source reference signal (RS) is indicated in the top block and is associated with a target signal indicated in the bottom block. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS: PUSCH DMRS, CSI-RS, TRS, and SRS.

As illustrated, each TCI-RS-SetConfig contains parameters. These parameters can, for example, configure quasi co-location relationship(s) between reference signals in the RS set and the DM-RS port group of the PDSCH. The RS set contains a reference to either one or two DL RSs and an associated quasi co-location type (QCL-Type) for each one configured by the higher layer parameter QCL-Type.

As illustrated in FIG. 5, for the case of two DL RSs, the QCL types can take on a variety of arrangements. For example, QCL types may not be the same, regardless of whether the references are to the same DL RS or different DL RSs. In the illustrated example, synchronization signal block (SSB) is associated with Type C QCL for P-TRS, while CSI-RS for beam management (CSIRS-BM) is associated with Type D QCL.

QCL information and/or types may in some scenarios depend on or be a function of other information. For example, the quasi co-location (QCL) types indicated to the UE can be based on higher layer parameter QCL-Type and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter}, Spatial QCL assumptions (QCL-TypeD) may be used to help a UE to select an analog Rx beam (e.g., during beam management procedures). For example, an SSB resource indicator may indicate a same beam for a previous reference signal should be used for a subsequent transmission.

Example CSI-RS for Multiple Beam Transmissions

Aspects of the present disclosure provide techniques for associating a reference signal, such as CSI-RS (e.g., aperiodic CSI-RS), with multiple TCI states to help with multiple beam transmissions.

Figure 6:
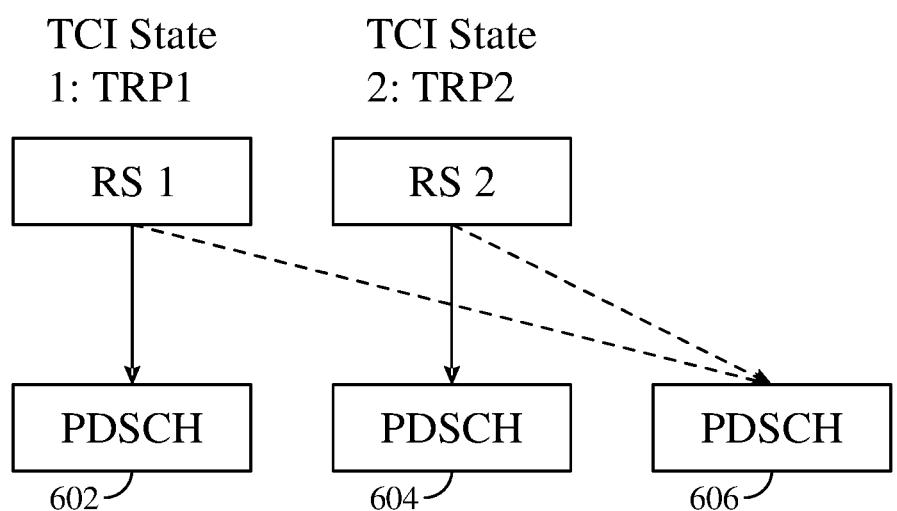
FIG. 6 illustrates an example of a downlink transmission being associated with multiple transmission configuration indication (TCI) states for a single-frequency network (SFN) transmission, in accordance with certain aspects of the present disclosure.

FIG. 6 illustrates an example of a downlink transmission being associated with multiple TCI states for a SFN transmission. In particular, as shown, reference signal (RS) 1 is transmitted by TRP 1 and RS 2 is transmitted by TRP 2. Further, RS 1 is associated with a TCI state 1 and RS 2 is associated with a TCI state 2.

PDSCH 602 is associated with TCI state 1, such as indicated in a DCI in a PDCCH to UE 120. Accordingly, as discussed, RS 1 and PDSCH 602 (e.g., PDSCH's DMRS) may be QCL'd. Further, PDSCH 604 is associated with TCI state 2, such as indicated in a DCI to UE 120. Accordingly, as discussed, RS 2 and PDSCH 604 may be QCL'd. Thus, UE 120 may perform receive beam training using RS 1 to determine one or more receive beams to use for receiving PDSCH 602, as discussed. Further, UE 120 may perform receive beam training using RS 2 to determine one or more receive beams to use for receiving PDSCH 604.

In certain aspects, PDSCH 606 is an SFN transmission from TRP 1 and TRP 2. PDSCH 606 is associated with TCI state 1 and TCI state 2. Certain aspects herein are used to indicate that PDSCH 606 is associated with both TCI state 1 and TCI state 2. Further, certain aspects herein, help UE 120 measure appropriate CSI-RS resources associated with both TCI state 1 and TCI state 2 for performing receive beam training and determining one or more receive beams to use to receive PDSCH 606 associated with both TCI state 1 and TCI state 2.

FIG. 7A illustrates a TCI state configuration of UE 120. For example, UE 120 is configured to receive, such as from BS 110, a TCI state configuration (e.g., a configuration of a plurality of TCI states). The UE 120 may receive the TCI state configuration via radio resource control (RRC) signaling. In certain aspects the TCI state configuration indicates a plurality of TCI states, such as up to 128 TCI states. The TCI state configuration, as shown, associates each TCI state with a corresponding index. Each TCI state, in certain aspects, indicates a CSI-RS or SSB ID associated with a particular CSI-RS or SSB and a QCL type.

FIG. 7B illustrates an active TCI state configuration of UE 120. For example, UE 120 is configured to receive, such as from BS 110, a selection of an active subset of the TCI states of the TCI state configuration (e.g., a configuration of activation of a subset of the plurality of TCI states). The UE 120 may receive the selection via a media access control—control element (MAC-CE). In certain aspects, the active TCI state configuration indicates a plurality of active TCI states, such as up to 8 active TCI states, which may be indicated using a 3-bit code point in scheduling DCI. The active TCI state configuration, as shown, associates each active TCI state with a corresponding index. Each active TCI state, in certain aspects, indicates one or more TCI states (e.g., one or more indexes of one or more TCI states) of the TCI state configuration. Accordingly, certain active TCI state indexes can be associated with multiple TCI states, such as shown with respect to index 1. Accordingly, in certain aspects, a single code point in scheduling DCI can indicate multiple TCI states.

In certain aspects, where an active TCI state index is associated with multiple TCI states, it is assumed that the active TCI state is for a multiple beam transmission. In certain aspects, as discussed, a multiple beam transmission can be SDM, FDM, TDM, or SFN. Accordingly, in certain aspects, an additional indication is provided, such as in the active TCI state configuration or separately (e.g., in scheduling DCI or higher layer signaling, such as MAC-CE or RRC) to indicate the type of multiple beam transmission the active TCI state is associated with.

In certain aspects, the CSI-RS measured by UE 120 is an aperiodic CSI-RS. In certain aspects, UE 120 is configured to receive, such as from BS 110, a configuration of one or more CSI-RS triggering states (e.g., in a configuration of aperiodic CSI reporting, such as in a higher layer parameter reportConfigType=aperiodic). The UE 120 may receive the configuration of the CSI-RS triggering states via RRC or MAC-CE. The configuration may include a CSI triggering state list (e.g., in a higher layer parameter AperiodicTriggerStateList) comprising a plurality of CSI-RS triggering states associated with corresponding indexes. In certain aspects, there are up to 63 CSI-RS triggering states in the CSI triggering state list that can be indicated using a 6-bit code point, such as in scheduling DCI or MAC-CE.

In certain aspects, each CSI-RS triggering state associates a CSI-RS resource set (e.g., aperiodic) with a set or sequence of TCI states. For example, in certain aspects, each CSI-RS triggering state is associated with an index, includes an identifier of a CSI-RS resource set, and includes identifiers of each TCI state of the sequence of TCI states. Each CSI-RS resource set comprises a plurality of CSI-RS resources (REs, RBs, time and frequency resources, etc.). The CSI-RS resource set may comprise the plurality of CSI-RS resources in a particular order, for example based on CSI-RS resource indicator (CRI). Further, the sequence of TCI states may be in a particular order. Accordingly, a given CSI-RS triggering state associates each of plurality of CSI-RS resources with a corresponding one or more TCI states.

FIG. 8A illustrates an example CSI triggering state list of UE 120 with the header "triggering states." Also shown in FIG. 8A is a TCI state configuration of UE 120. As shown, each TCI state in the sequence of TCI states for each CSI-RS triggering state is indicated by an index from the TCI state configuration. Thus, the TCI states in the CSI-RS triggering state correspond to TCI states from the TCI state configuration. Further, in the example of FIG. 8A, each sequence entry of the sequence of TCI states includes a single identifier, and the identifier is associated with only a single TCI state based on the TCI state configuration. Thus, in the example of FIG. 8A, for each CSI-RS triggering state, each CSI-RS resource in the corresponding CSI-RS resource set can only be associated with a single TCI state.

Accordingly, using such a CSI triggering state list as shown in FIG. 8A, it is not possible to associate a single CSI-RS resource with multiple TCI states, such as for multiple beam transmissions as discussed. Therefore, the UE 120 may perform separate receive beam training for separate TCI states by measuring separate CSI-RS resources when triggered to measure CSI-RS (e.g., by an index to a CSI-RS triggering state in MAC-CE or DCI). Each beam training may result in different receive beams associated with the separate TCI states, where the receive beams could use the same or even different antenna modules or arrays of the UE 120. If the UE 120 then receives a control signal (e.g., MAC-CE or DCI such as in PDCCH) indicating an upcoming downlink signal (e.g., on PDSCH) transmitted using multiple beam transmissions is associated with multiple TCI states (e.g., the control signal including indexes of multiple TCI states of the TCI state configuration or active TCI state configuration), the UE 120 may have to suboptimally decide which one or more receive beams to use to receive the downlink signal. For example, if the TCI states are associated with different receive beams of different antenna modules or arrays of the UE 120, the UE 120 may use each of the different receive beams at the same time to receive the downlink signal. However, if the TCI states are associated with different receive beams of the same antenna modules or arrays of the UE 120, the UE may need to select one of the receive beams, or compose a composite receive beam of the different receive beams, which may adversely affect receiver gain, and lead to potential inability to properly decode the downlink signal.

Accordingly, aspects of the present disclosure provide techniques for associating a reference signal, such as CSI-RS (e.g., aperiodic CSI-RS), with multiple TCI states to help with multiple beam transmissions.

FIG. 8B illustrates another example CSI triggering state list of UE 120 with the header "triggering states." Also shown in FIG. 8B is a TCI state configuration of UE 120. In the example of FIG. 8B, each sequence entry of the sequence of TCI states includes one or more identifiers, and each identifier is associated with a single TCI state based on the TCI state configuration. Thus, in the example of FIG. 8B, for each CSI-RS triggering state, each CSI-RS resource in the corresponding CSI-RS resource set can be associated with one or more TCI states, and thus multiple TCI states. In certain aspects, where a CSI-RS resource is associated with multiple TCI states, it is assumed that the CSI-RS resource is for a multiple beam transmission. In certain aspects, as discussed, a multiple beam transmission can be SDM, FDM, TDM, or SFN. Accordingly, in certain aspects, an additional indication is provided, such as in the configuration of one or more CSI-RS triggering states or separately (e.g., in scheduling DCI or higher layer signaling, such as MAC-CE or RRC) to indicate the type of multiple beam transmission the CSI-RS resource is associated with.

Accordingly, using the CSI triggering state list of FIG. 8B, the UE 120 may perform receive beam training for a combination of multiple TCI states by measuring a CSI-RS resource associated with the combination of multiple TCI states. The resulting one or more receive beams are then associated with the combination of multiple TCI states. If the UE 120 then receives a control signal (e.g., MAC-CE or DCI such as in PDCCH) indicating an upcoming downlink signal (e.g., on PDSCH) transmitted using multiple beam transmissions is associated with multiple TCI states (e.g., the control signal including indexes of multiple TCI states of the TCI state configuration or active TCI state configuration and optionally an indication of the type of multiple beam transmission), the UE 120 may use the determined one or more receive beams associated with the combination of the multiple TCI states. This may improve receiver gain as compared to the example discussed with respect to FIG. 8A.

FIG. 8C illustrates another example CSI triggering state list of UE 120 with the header "triggering states." Also shown in FIG. 8C is an active TCI state configuration of UE 120. In the example of FIG. 8C, each sequence entry of the sequence of TCI states includes one identifier, and each identifier is associated with either a single TCI state based on the TCI state configuration or a single active TCI state based on the active TCI state configuration. In certain aspects, additional information is included for each sequence entry to differentiate between whether the identifier is from the TCI state configuration or the active TCI state configuration. As previously discussed, a single active TCI state may be associated with multiple TCI states from the TCI state configuration.

Thus, in the example of FIG. 8C, for each CSI-RS triggering state, each CSI-RS resource in the corresponding CSI-RS resource set can be associated with an active TCI state, which may correspond to one or more TCI states, and thus multiple TCI states. In certain aspects, where a CSI-RS resource is associated with multiple TCI states, it is assumed that the CSI-RS resource is for a multiple beam transmission. In certain aspects, as discussed, a multiple beam transmission can be SDM, FDM, TDM, or SFN. Accordingly, in certain aspects, an additional indication is provided, such as in the configuration of one or more CSI-RS triggering states or separately (e.g., in scheduling DCI or higher layer signaling, such as MAC-CE or RRC) to indicate the type of multiple beam transmission the CSI-RS resource is associated with. Thus, the example of FIG. 8C also provides the discussed advantages of FIG. 8B of a single CSI-RS resource being associated with multiple TCI states.

In addition, the example of FIG. 8C provides an advantage where if an active TCI state in the active TCI state configuration is updated (e.g., by MAC-CE) to be associated with different TCI states, then the relationship for a CSI-RS resource associated with the active TCI state is also automatically updated (e.g., the QCL relationship for the associated CSI-RS is automatically updated).

It should be noted that though certain aspects are described herein as using a CSI-RS resource associated with one or more TCI states to determine one or more receive beams of the UE 120 to be used for downlink transmissions associated with the one or more TCI states, a CSI-RS resource associated with the one or more TCI states may additionally or alternatively be used to determine one or more other receive parameters such as one or more of precoding, rank, or channel quality indicator of the UE 120 to be used for downlink transmissions associated with the one or more TCI states. For example, a CSI-RS resource associated multiple TCI states may allow UE 120 to calculate and feedback suitable CSI to BS 110, to be used for later multiple beam transmissions. Accordingly, a receive parameter, as used herein, may refer to one or more of a receive beam, a precoding, a rank, or a channel quality indicator.

Figure 9:
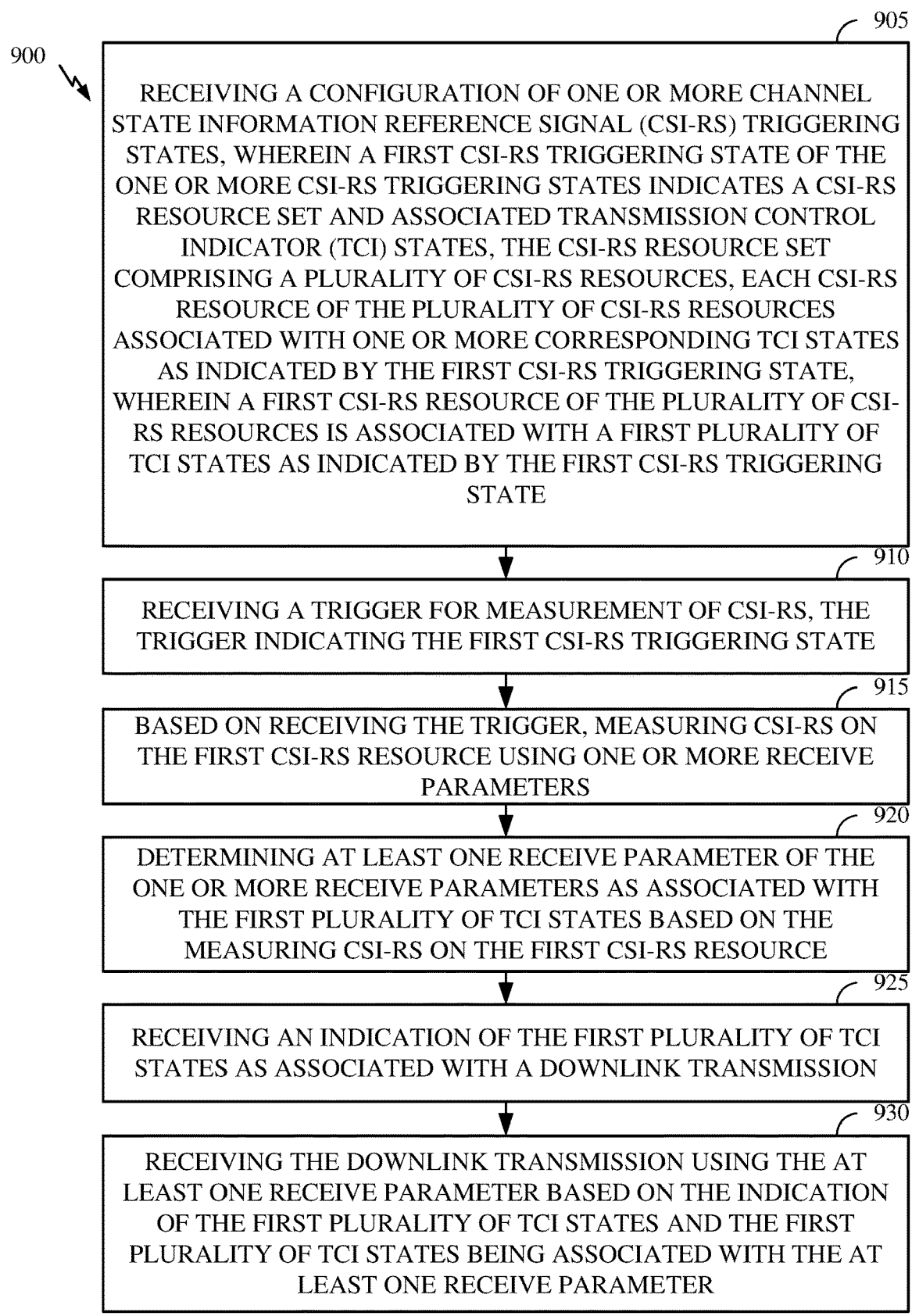
FIG. 9 is a flow diagram illustrating example operations for wireless communication by a UE, in accordance with certain aspects of the present disclosure.

FIG. 9 is a flow diagram illustrating example operations 900 for wireless communication, in accordance with certain aspects of the present disclosure. The operations 900 may be performed, for example, by UE (e.g., such as a UE 120a in the wireless communication network 100). The operations 900 may be complimentary operations by the UE to the operations 1000 performed by the BS. Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at 905, by receiving a configuration of one or more channel state information reference signal (CSI-RS) triggering states. A first CSI-RS triggering state of the one or more CSI-RS triggering states indicates a CSI-RS resource set and associated transmission configuration indication (TCI) states. The CSI-RS resource set comprises a plurality of CSI-RS resources. Each CSI-RS resource of the plurality of CSI-RS resources is associated with one or more corresponding TCI states as indicated by the first CSI-RS triggering state. A first CSI-RS resource of the plurality of CSI-RS resources is associated with a first plurality of TCI states as indicated by the first CSI-RS triggering state.

At 910, the UE receives a trigger for measurement of CSI-RS, the trigger indicating the first CSI-RS triggering state. At 915, the UE, based on receiving the trigger, measures CSI-RS on the first CSI-RS resource using one or more receive parameters. Further, at 920, the UE determines at least one receive parameter of the one or more receive parameters as associated with the first plurality of TCI states based on the measuring CSI-RS on the first CSI-RS resource. Continuing, at 925, the UE receives an indication of the first plurality of TCI states as associated with a downlink transmission. At 930, the UE receives the downlink transmission using the at least one receive parameter based on the indication of the first plurality of TCI states and the first plurality of TCI states being associated with the at least one receive parameter.

In certain aspects, of operations 900, the first CSI-resource is transmitted as multiple beams using multiple antenna modules or arrays.

In certain aspects, of operations 900, the multiple antenna modules or arrays correspond to a single transmitter.

In certain aspects, of operations 900, the multiple antenna modules or arrays correspond to multiple transmitters.

In certain aspects, of operations 900, the multiple beams are multiplexed together in one or more of space, time, or frequency.

In certain aspects, of operations 900, the multiple beams are transmitted on a same time and frequency resource with a same waveform, modulation, coding, and scrambling as part of a single-frequency network.

In certain aspects, of operations 900, at least one of the trigger or the configuration of the one or more CSI-RS triggering states indicates whether the first CSI-RS resource is associated with a multiplexed transmission or a single-frequency network transmission.

In certain aspects, of operations 900, the configuration of the one or more CSI-RS triggering states is received via radio resource control (RRC) signaling or a media access control—control element (MAC-CE).

In certain aspects, of operations 900, the trigger is received via a media access control—control element (MAC-CE) or downlink control information (DCI).

In certain aspects, of operations 900, the indication is received via a media access control—control element (MAC-CE) or downlink control information (DCI).

In certain aspects, of operations 900, the downlink transmission is quasi co-located with the first CSI-RS resource.

In certain aspects, of operations 900, operations 900 further include receiving a configuration of a plurality of TCI states associated with corresponding first indexes; and receiving a configuration of activation of a subset of the plurality of TCI states associated with corresponding second indexes.

In certain aspects, of operations 900, the configuration of the plurality of TCI states is received via radio resource control (RRC) signaling, and wherein the configuration of activation is received via a media access control—control element (MAC-CE).

In certain aspects, of operations 900, the first plurality of TCI states are indicated using the first indexes.

In certain aspects, of operations 900, the first plurality of TCI states are indicated using the second indexes.

In certain aspects, of operations 900, a single index of the second indexes is associated with the first plurality of TCI states.

In certain aspects, of operations 900, when the single index is updated to be associated with another one or more TCI states, the first CSI-RS resource is updated to be associated with the other one or more TCI states.

In certain aspects, of operations 900, the at least one receive parameter comprises at least one of at least one receive beam, a precoding, a rank, or a channel quality indicator.

Figure 10:
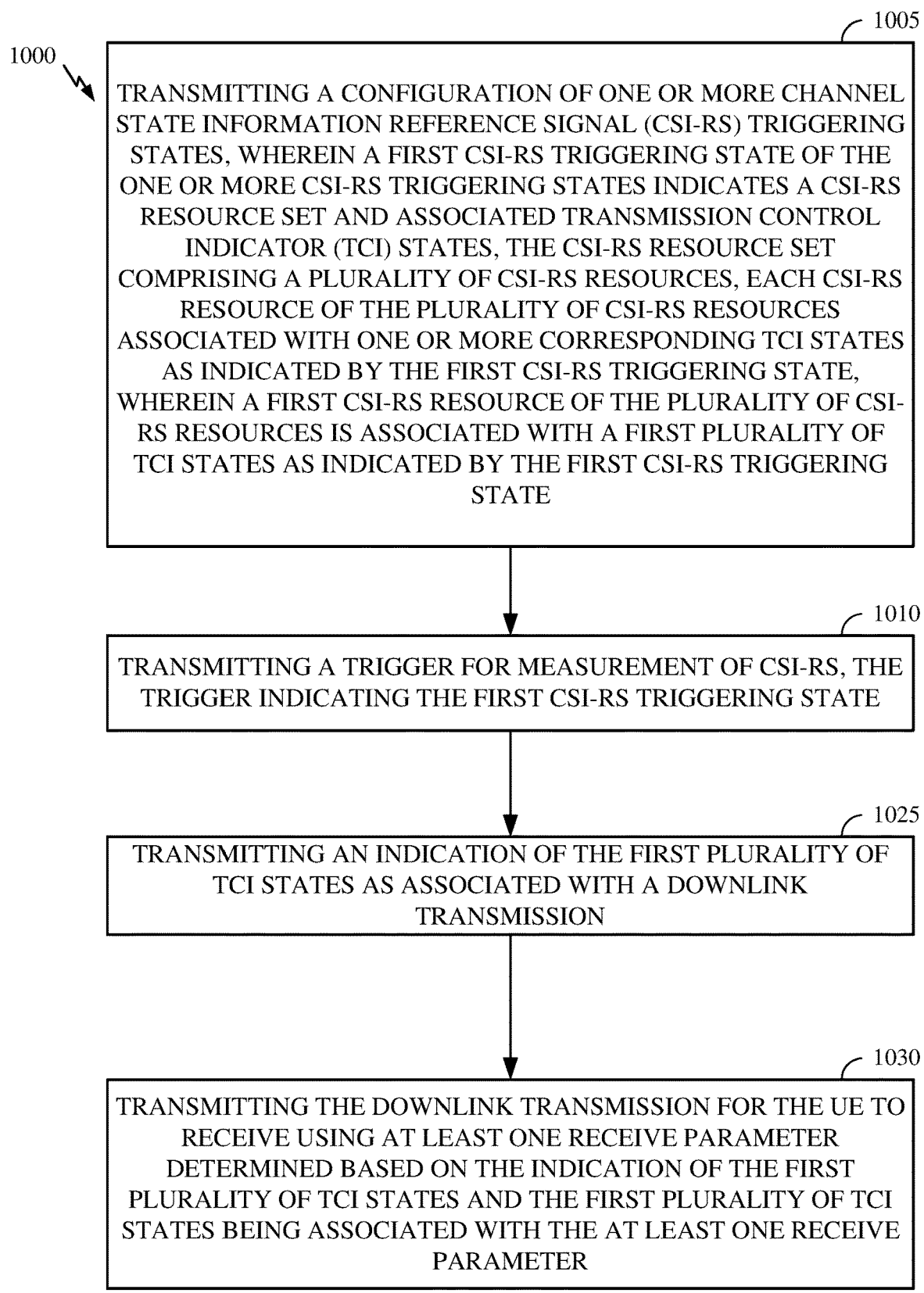
FIG. 10 is a flow diagram illustrating example operations for wireless communication by a BS, in accordance with certain aspects of the present disclosure.

FIG. 10 is a flow diagram illustrating example operations 1000 for wireless communication, in accordance with certain aspects of the present disclosure. The operations 1000 may be performed, for example, by a transmitter such as a BS (e.g., such as the BS 110a in the wireless communication network 100). The operations 1000 may be complimentary operations by the BS to the operations 900 performed by the UE. Operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 may begin, at 1005, by transmitting a configuration of one or more channel state information reference signal (CSI-RS) triggering states. A first CSI-RS triggering state of the one or more CSI-RS triggering states indicates a CSI-RS resource set and associated transmission configuration indication (TCI) states. The CSI-RS resource set comprises a plurality of CSI-RS resources. Each CSI-RS resource of the plurality of CSI-RS resources is associated with one or more corresponding TCI states as indicated by the first CSI-RS triggering state. A first CSI-RS resource of the plurality of CSI-RS resources is associated with a first plurality of TCI states as indicated by the first CSI-RS triggering state.

At 1010, the transmitter transmits a trigger for measurement of CSI-RS, the trigger indicating the first CSI-RS triggering state. Continuing, at 1025, the transmitter transmits an indication of the first plurality of TCI states as associated with a downlink transmission. At 1030, transmitter transmits the downlink transmission for the UE to receive using at least one receive parameter determined based on the indication of the first plurality of TCI states and the first plurality of TCI states being associated with the at least one receive parameter.

In certain aspects, of operations 1000, the first CSI-resource is transmitted as multiple beams using multiple antenna modules or arrays.

In certain aspects, of operations 1000, the multiple antenna modules or arrays correspond to a single transmitter.

In certain aspects, of operations 1000, the multiple antenna modules or arrays correspond to multiple transmitters.

In certain aspects, of operations 1000, the multiple beams are multiplexed together in one or more of space, time, or frequency.

In certain aspects, of operations 1000, the multiple beams are transmitted on a same time and frequency resource with a same waveform, modulation, coding, and scrambling as part of a single-frequency network.

In certain aspects, of operations 1000, at least one of the trigger or the configuration of the one or more CSI-RS triggering states indicates whether the first CSI-RS resource is associated with a multiplexed transmission or a single-frequency network transmission.

In certain aspects, of operations 1000, the configuration of the one or more CSI-RS triggering states is transmitted via radio resource control (RRC) signaling or a media access control—control element (MAC-CE).

In certain aspects, of operations 1000, the trigger is transmitted via a media access control—control element (MAC-CE) or downlink control information (DCI).

In certain aspects, of operations 1000, the indication is transmitted via a media access control—control element (MAC-CE) or downlink control information (DCI).

In certain aspects, of operations 1000, the downlink transmission is quasi co-located with the first CSI-RS resource.

In certain aspects, of operations 1000, operations 1000 further include transmitting a configuration of a plurality of TCI states associated with corresponding first indexes; and transmitting a configuration of activation of a subset of the plurality of TCI states associated with corresponding second indexes.

In certain aspects, of operations 1000, the configuration of the plurality of TCI states is transmitted via radio resource control (RRC) signaling, and wherein the configuration of activation is transmitted via a media access control—control element (MAC-CE).

In certain aspects, of operations 1000, the first plurality of TCI states are indicated using the first indexes.

In certain aspects, of operations 1000, the first plurality of TCI states are indicated using the second indexes.

In certain aspects, of operations 1000, a single index of the second indexes is associated with the first plurality of TCI states.

In certain aspects, of operations 1000, when the single index is updated to be associated with another one or more TCI states, the first CSI-RS resource is updated to be associated with the other one or more TCI states.

In certain aspects, of operations 1000, the one or more receive parameters comprise one or more of one or more receive beams, a precoding, a rank, or a channel quality indicator.

Figure 11:
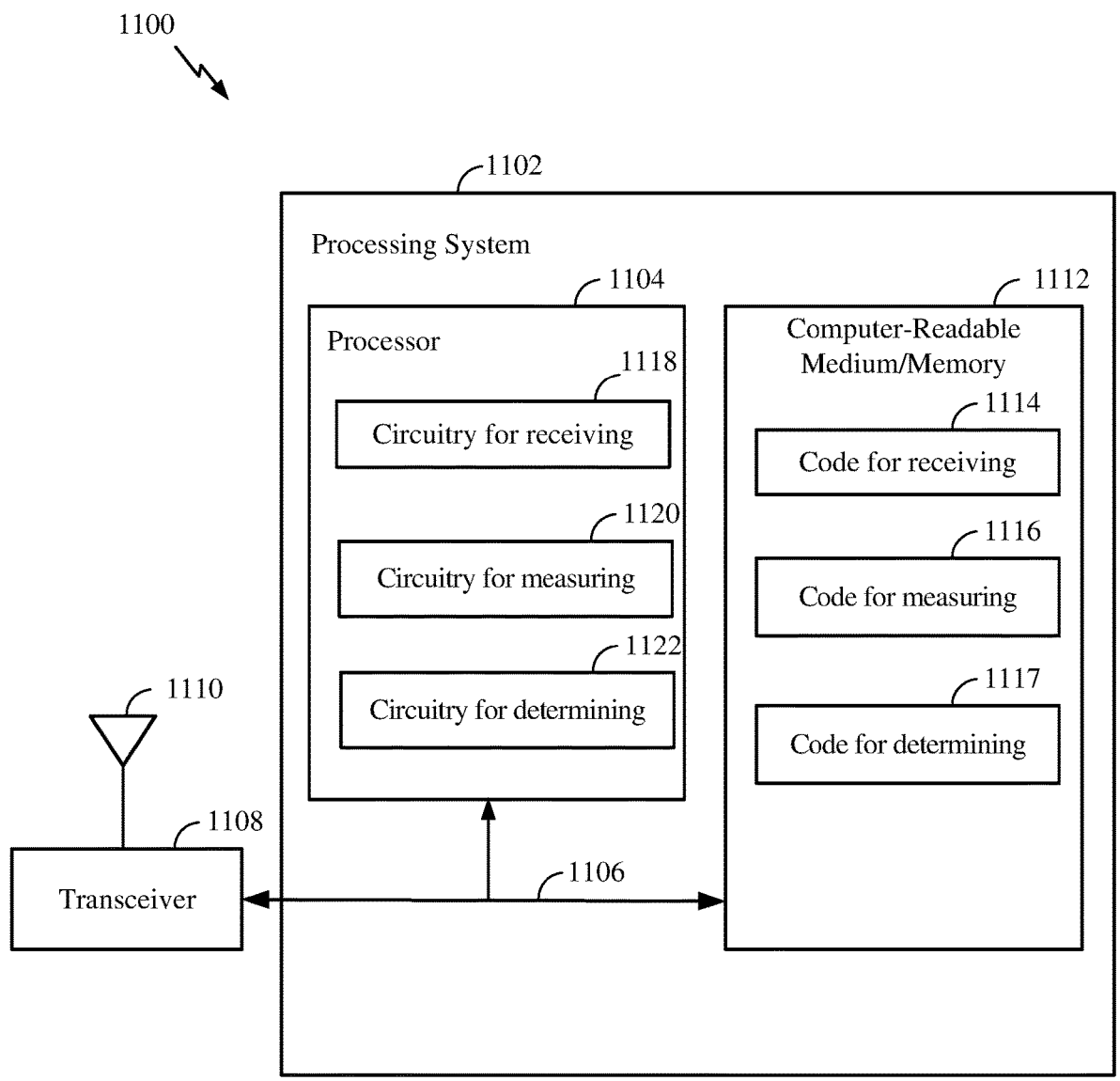
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for CSI-RS for multiple beam transmissions.

In certain aspects, computer-readable medium/memory 1112 stores code 1114 for (e.g., an example of means for) receiving; code 1116 for (e.g., an example of means for) measuring, code 1117 for (e.g., an example of means for) determining, etc. One or more of code 1114-1117 may be executed by a general-purpose processor, a digital signal processor (DSP), an application-specific integrated circuit (ASIC), a field programmable gate array (FPGA) or other programmable logic device. In certain aspects, the processor 1104 executes the code stored in the computer-readable medium/memory 1112. In certain aspects, computer-readable medium/memory 1112 is an example of a CSI-RS manager 122.

In certain aspects, alternatively or additionally, the processor 1104 has circuitry configured to implement the code stored in the computer-readable medium/memory 1112. The processor 1104 includes circuitry 1118 for (e.g., an example of means for) receiving; circuitry 1120 for (e.g., an example of means for) measuring, circuitry 1122 for (e.g., an example of means for) determining, etc. One or more of circuitry 1118-1122 may be implemented by one or more of a general-purpose processor, a digital signal processor (DSP), an application-specific integrated circuit (ASIC), a field programmable gate array (FPGA) or other programmable logic device. In certain aspects, processor 1104 is an example of a CSI-RS manager 122.

The transceiver 1108 may provide a means for receiving information such as packets, user data, or control information associated with various information channels (e.g., control channels, data channels, and information related to power saving of smart repeaters based on a triggering signal, etc.). Information may be passed on to other components of the device 1100. The transceiver 1108 may be an example of aspects of the transceiver 254 described with reference to FIG. 2. The antenna 1110 may correspond to a single antenna or a set of antennas, and may be an example of aspects of the antennas 252 described with reference to FIG. 2. The transceiver 1108 may provide means for transmitting signals generated by other components of the device 1100.

Figure 12:
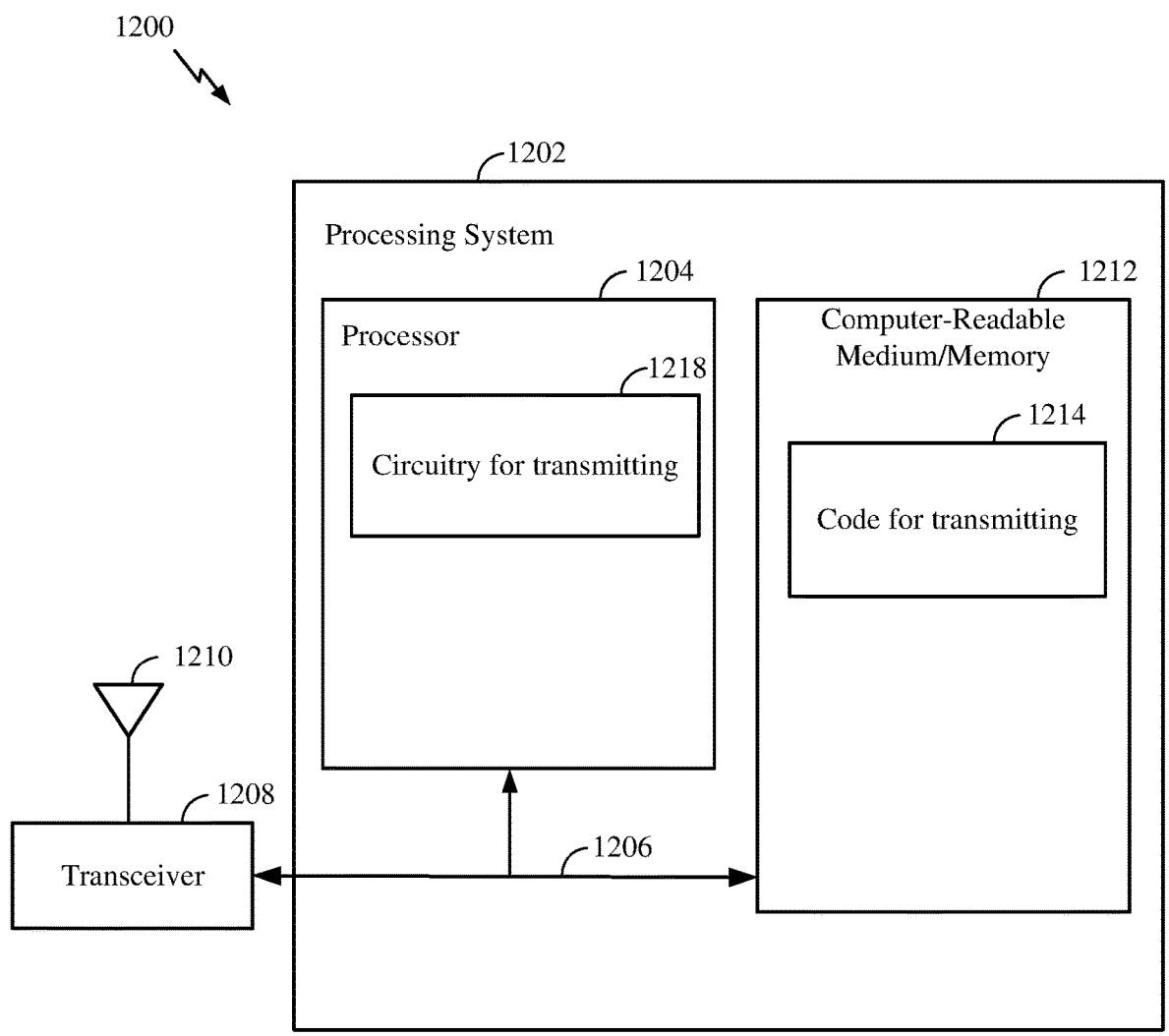
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/ memory 1212 is configured to store instructions (e.g., computer-executable code) that when executed by the processor 1204, cause the processor 1204 to perform the operations illustrated in FIG. 10, or other operations for performing the various techniques discussed herein for CSI-RS for multiple beam transmissions.

In certain aspects, computer-readable medium/memory 1212 stores code 1214 for (e.g., an example of means for) transmitting, etc. Code 1214 may be executed by a general-purpose processor, a digital signal processor (DSP), an application-specific integrated circuit (ASIC), a field programmable gate array (FPGA) or other programmable logic device. In certain aspects, the processor 1104 executes the code stored in the computer-readable medium/memory 1212. In certain aspects, computer-readable medium/ memory 1212 is an example of a CSI-RS manager 112.

In certain aspects, alternatively or additionally, the processor 1204 has circuitry configured to implement the code stored in the computer-readable medium/memory 1212. The processor 1204 includes circuitry 1218 for (e.g., an example of means for) transmitting, etc. Circuitry 1218 may be implemented by one or more of a general-purpose processor, a digital signal processor (DSP), an application-specific integrated circuit (ASIC), a field programmable gate array (FPGA) or other programmable logic device. In certain aspects, processor 1204 is an example of a CSI-RS manager 112.

The transceiver 1208 may provide a means for receiving information such as packets, user data, or control information associated with various information channels (e.g., control channels, data channels, and information related to power saving of smart repeaters based on a triggering signal, etc.). Information may be passed on to other components of the device 1200. The transceiver 1208 may be an example of aspects of the transceiver 232 described with reference to FIG. 2. The antenna 1210 may correspond to a single antenna or a set of antennas, and may be an example of aspects of the antennas 234 described with reference to FIG. 2. The transceiver 1208 may provide means for transmitting signals generated by other components of the device 1200.

EXAMPLE ASPECTS

1. A method of wireless communication by a user equipment (UE), the method comprising: receiving a configuration of one or more channel state information reference signal (CSI-RS) triggering states, wherein a first CSI-RS triggering state of the one or more CSI-RS triggering states indicates a CSI-RS resource set and associated transmission configuration indication (TCI) states, the CSI-RS resource set comprising a plurality of CSI-RS resources, each CSI-RS resource of the plurality of CSI-RS resources associated with one or more corresponding TCI states as indicated by the first CSI-RS triggering state, wherein a first CSI-RS resource of the plurality of CSI-RS resources is associated with a first plurality of TCI states as indicated by the first CSI-RS triggering state; receiving a trigger for measurement of CSI-RS, the trigger indicating the first CSI-RS triggering state; based on receiving the trigger, measuring CSI-RS on the first CSI-RS resource using one or more receive parameters; determining at least one receive parameter of the one or more receive parameters as associated with the first plurality of TCI states based on the measuring CSI-RS on the first CSI-RS resource; receiving an indication of the first plurality of TCI states as associated with a downlink transmission; and receiving the downlink transmission using the at least one receive parameter based on the indication of the first plurality of TCI states and the first plurality of TCI states being associated with the at least one receive parameter.

2. The method of aspect 1, wherein the first CSI-resource is transmitted as multiple beams using multiple antenna modules or arrays.

3. The method of aspect 2, wherein the multiple antenna modules or arrays correspond to a single transmitter.

4. The method of aspect 2, wherein the multiple antenna modules or arrays correspond to multiple transmitters.

5. The method of any of aspects 2-4, wherein the multiple beams are multiplexed together in one or more of space, time, or frequency.

6. The method of any of aspects 2-4, wherein the multiple beams are transmitted on a same time and frequency resource with a same waveform, modulation, coding, and scrambling as part of a single-frequency network.

7. The method of any of aspects 2-6, wherein at least one of the trigger or the configuration of the one or more CSI-RS triggering states indicates whether the first CSI-RS resource is associated with a multiplexed transmission or a single-frequency network transmission.

8. The method of any of aspects 1-7, wherein the configuration of the one or more CSI-RS triggering states is received via radio resource control (RRC) signaling or a media access control—control element (MAC-CE).

9. The method of any of aspects 1-8, wherein the trigger is received via a media access control—control element (MAC-CE) or downlink control information (DCI).

10. The method of any of aspects 1-9, wherein the indication is received via a media access control—control element (MAC-CE) or downlink control information (DCI).

11. The method of any of aspects 1-10, wherein the downlink transmission is quasi co-located with the first CSI-RS resource.

12. The method of any of aspects 1-11, further comprising: receiving a configuration of a plurality of TCI states associated with corresponding first indexes; and receiving a configuration of activation of a subset of the plurality of TCI states associated with corresponding second indexes.

13. The method of aspect 12, wherein the configuration of the plurality of TCI states is received via radio resource control (RRC) signaling, and wherein the configuration of activation is received via a media access control—control element (MAC-CE).

14. The method of any of aspects 12-13, wherein the first plurality of TCI states are indicated using the first indexes.

15. The method of any of aspects 12-13, wherein the first plurality of TCI states are indicated using the second indexes.

16. The method of aspect 15, wherein a single index of the second indexes is associated with the first plurality of TCI states.

17. The method of aspect 16, wherein when the single index is updated to be associated with another one or more TCI states, the first CSI-RS resource is updated to be associated with the other one or more TCI states.

18. The method of any of aspects 1-17, wherein the at least one receive parameter comprises at least one of at least one receive beam, a precoding, a rank, or a channel quality indicator.

19. A method of wireless communication by a transmitter, the method comprising: transmitting, to a user equipment (UE), a configuration of one or more channel state information reference signal (CSI-RS) triggering states, wherein a first CSI-RS triggering state of the one or more CSI-RS triggering states indicates a CSI-RS resource set and associated transmission configuration indication (TCI) states, the CSI-RS resource set comprising a plurality of CSI-RS resources, each CSI-RS resource of the plurality of CSI-RS resources associated with one or more corresponding TCI states as indicated by the first CSI-RS triggering state, wherein a first CSI-RS resource of the plurality of CSI-RS resources is associated with a first plurality of TCI states as indicated by the first CSI-RS triggering state; transmitting, to the UE, a trigger for measurement of CSI-RS, the trigger indicating the first CSI-RS triggering state; transmitting, to the UE, an indication of the first plurality of TCI states as associated with a downlink transmission; and transmitting, to the UE, the downlink transmission for the UE to receive using at least one receive parameter determined based on the indication of the first plurality of TCI states and the first plurality of TCI states being associated with the at least one receive parameter.

20. The method of aspect 19, wherein the first CSI-resource is transmitted as multiple beams using multiple antenna modules or arrays.

21. The method of aspect 20, wherein the multiple antenna modules or arrays correspond to a single transmitter.

22. The method of aspect 20, wherein the multiple antenna modules or arrays correspond to multiple transmitters.

23. The method of any of aspects 20-22, wherein the multiple beams are multiplexed together in one or more of space, time, or frequency.

24. The method of any of aspects 20-22, wherein the multiple beams are transmitted on a same time and frequency resource with a same waveform, modulation, coding, and scrambling as part of a single-frequency network.

25. The method of any of aspects 20-24, wherein at least one of the trigger or the configuration of the one or more CSI-RS triggering states indicates whether the first CSI-RS resource is associated with a multiplexed transmission or a single-frequency network transmission.

26. The method of any of aspects 19-25, wherein the configuration of the one or more CSI-RS triggering states is transmitted via radio resource control (RRC) signaling or a media access control—control element (MAC-CE).

27. The method of any of aspects 19-26, wherein the trigger is transmitted via a media access control—control element (MAC-CE) or downlink control information (DCI).

28. The method of any of aspects 19-27, wherein the indication is transmitted via a media access control—control element (MAC-CE) or downlink control information (DCI).

29. The method of any of aspects 19-28, wherein the downlink transmission is quasi co-located with the first CSI-RS resource.

30. The method of any of aspects 19-29, further comprising: transmitting a configuration of a plurality of TCI states associated with corresponding first indexes; and transmitting a configuration of activation of a subset of the plurality of TCI states associated with corresponding second indexes.

31. The method of any of aspects 30, wherein the configuration of the plurality of TCI states is transmitted via radio resource control (RRC) signaling, and wherein the configuration of activation is transmitted via a media access control—control element (MAC-CE).

32. The method of any of aspects 30-31, wherein the first plurality of TCI states are indicated using the first indexes.

33. The method of any of aspects 30-31, wherein the first plurality of TCI states are indicated using the second indexes.

34. The method of aspect 33, wherein a single index of the second indexes is associated with the first plurality of TCI states.

35. The method of aspect 34, wherein when the single index is updated to be associated with another one or more TCI states, the first CSI-RS resource is updated to be associated with the other one or more TCI states.

36. The method of any of aspects 19-35, wherein the one or more receive parameters comprise one or more of one or more receive beams, a precoding, a rank, or a channel quality indicator.

37. A user equipment (UE) comprising: a memory; and a processor coupled to the memory, wherein the memory and the processor are configured to perform the method of one or more of aspects 1-18.

38. A transmitter comprising: a memory; and a processor coupled to the memory, wherein the memory and the processor are configured to perform the method of one or more of aspects 19-36.

39. A user equipment (UE) comprising: various means for performing the method of one or more of aspects 1-18.

40. A transmitter comprising: various means for performing the method of one or more of aspects 19-36.

41. A non-transitory computer-readable medium including instructions that when executed by a user equipment (UE), cause the UE to perform the method of one or more of aspects 1-18.

42. A non-transitory computer-readable medium including instructions that when executed by a transmitter, cause the transmitter to perform the method of one or more of aspects 19-36.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), the method comprising:
   receiving a configuration of one or more channel state information reference signal (CSI-RS) triggering states, wherein a first CSI-RS triggering state of the one or more CSI-RS triggering states indicates a CSI-RS resource set and associated transmission configuration indication (TCI) states, the CSI-RS resource set comprising a plurality of CSI-RS resources, each CSI-RS resource of the plurality of CSI-RS resources associated with one or more corresponding TCI states as indicated by the first CSI-RS triggering state, wherein a first CSI-RS resource of the plurality of CSI-RS resources is associated with a first plurality of TCI states as indicated by the first CSI-RS triggering state;
   receiving a trigger for measurement of CSI-RS, the trigger indicating the first CSI-RS triggering state;
   based on receiving the trigger, measuring CSI-RS on the first CSI-RS resource using one or more receive parameters;
   determining at least one receive parameter of the one or more receive parameters as associated with the first plurality of TCI states based on the measuring CSI-RS on the first CSI-RS resource;
   receiving an indication of the first plurality of TCI states as associated with a downlink transmission; and
   receiving the downlink transmission using the at least one receive parameter based on the indication of the first plurality of TCI states and the first plurality of TCI states being associated with the at least one receive parameter.

2. The method of claim 1, wherein the first CSI-resource is transmitted as multiple beams using multiple antenna modules or arrays.

3. The method of claim 2, wherein at least one of the trigger or the configuration of the one or more CSI-RS triggering states indicates whether the first CSI-RS resource is associated with a multiplexed transmission or a single-frequency network transmission.

4. The method of claim 1, wherein the configuration of the one or more CSI-RS triggering states is received via radio resource control (RRC) signaling or media access control—control element (MAC-CE), wherein the trigger is received via MAC-CE or downlink control information (DCI), and wherein the indication is received via MAC-CE or DCI.

5. The method of claim 1, further comprising:
   receiving a configuration of a plurality of TCI states associated with corresponding first indexes; and
   receiving a configuration of activation of a subset of the plurality of TCI states associated with corresponding second indexes, wherein the first plurality of TCI states are indicated using the first indexes.

6. The method of claim 1, further comprising:
   receiving a configuration of a plurality of TCI states associated with corresponding first indexes; and
   receiving a configuration of activation of a subset of the plurality of TCI states associated with corresponding second indexes, wherein the first plurality of TCI states are indicated using the second indexes.

7. The method of claim 6, wherein a single index of the second indexes is associated with the first plurality of TCI states.

8. The method of claim 7, wherein when the single index is updated to be associated with another one or more TCI states, the first CSI-RS resource is updated to be associated with the other one or more TCI states.

9. The method of claim 1, wherein the at least one receive parameter comprises at least one of at least one receive beam, a precoding, a rank, or a channel quality indicator.

10. A method of wireless communication by a transmitter, the method comprising:
    transmitting, to a user equipment (UE), a configuration of one or more channel state information reference signal (CSI-RS) triggering states, wherein a first CSI-RS triggering state of the one or more CSI-RS triggering states indicates a CSI-RS resource set and associated transmission configuration indication (TCI) states, the CSI-RS resource set comprising a plurality of CSI-RS resources, each CSI-RS resource of the plurality of CSI-RS resources associated with one or more corresponding TCI states as indicated by the first CSI-RS triggering state, wherein a first CSI-RS resource of the plurality of CSI-RS resources is associated with a first plurality of TCI states as indicated by the first CSI-RS triggering state;
    transmitting, to the UE, a trigger for measurement of CSI-RS, the trigger indicating the first CSI-RS triggering state;
    transmitting, to the UE, an indication of the first plurality of TCI states as associated with a downlink transmission; and
    transmitting, to the UE, the downlink transmission for the UE to receive using at least one receive parameter determined based on the indication of the first plurality of TCI states and the first plurality of TCI states being associated with the at least one receive parameter.

11. The method of claim 10, wherein the first CSI-resource is transmitted as multiple beams using multiple antenna modules or arrays.

12. The method of claim 11, wherein at least one of the trigger or the configuration of the one or more CSI-RS triggering states indicates whether the first CSI-RS resource is associated with a multiplexed transmission or a single-frequency network transmission.

13. The method of claim 10, wherein the configuration of the one or more CSI-RS triggering states is transmitted via radio resource control (RRC) signaling or media access control—control element (MAC-CE), wherein the trigger is transmitted via MAC-CE or downlink control information (DCI), and wherein the indication is transmitted via MAC-CE or DCI.

14. The method of claim 10, further comprising:
    transmitting a configuration of a plurality of TCI states associated with corresponding first indexes; and
    transmitting a configuration of activation of a subset of the plurality of TCI states associated with corresponding second indexes, wherein the first plurality of TCI states are indicated using the first indexes.

15. The method of claim 10, further comprising:
transmitting a configuration of a plurality of TCI states associated with corresponding first indexes; and
transmitting a configuration of activation of a subset of the plurality of TCI states associated with corresponding second indexes, wherein the first plurality of TCI states are indicated using the second indexes.

16. The method of claim 15, wherein a single index of the second indexes is associated with the first plurality of TCI states.

17. The method of claim 16, wherein when the single index is updated to be associated with another one or more TCI states, the first CSI-RS resource is updated to be associated with the other one or more TCI states.

18. The method of claim 10, wherein the one or more receive parameters comprise one or more of one or more receive beams, a precoding, a rank, or a channel quality indicator.

19. A user equipment (UE) comprising:
a memory; and
a processor coupled to the memory, wherein the memory and the processor are configured to:
receive a configuration of one or more channel state information reference signal (CSI-RS) triggering states, wherein a first CSI-RS triggering state of the one or more CSI-RS triggering states indicates a CSI-RS resource set and associated transmission configuration indication (TCI) states, the CSI-RS resource set comprising a plurality of CSI-RS resources, each CSI-RS resource of the plurality of CSI-RS resources associated with one or more corresponding TCI states as indicated by the first CSI-RS triggering state, wherein a first CSI-RS resource of the plurality of CSI-RS resources is associated with a first plurality of TCI states as indicated by the first CSI-RS triggering state;
receive a trigger for measurement of CSI-RS, the trigger indicating the first CSI-RS triggering state;
based on receiving the trigger, measure CSI-RS on the first CSI-RS resource using one or more receive parameters;
determine at least one receive parameter of the one or more receive parameters as associated with the first plurality of TCI states based on the measuring CSI-RS on the first CSI-RS resource;
receive an indication of the first plurality of TCI states as associated with a downlink transmission; and
receive the downlink transmission using the at least one receive parameter based on the indication of the first plurality of TCI states and the first plurality of TCI states being associated with the at least one receive parameter.

20. The UE of claim 19, wherein the memory and the processor are further configured to:
receive a configuration of a plurality of TCI states associated with corresponding first indexes; and
receive a configuration of activation of a subset of the plurality of TCI states associated with corresponding second indexes, wherein the first plurality of TCI states are indicated using the first indexes.

21. The UE of claim 19, wherein the memory and the processor are further configured to:
receive a configuration of a plurality of TCI states associated with corresponding first indexes; and
receive a configuration of activation of a subset of the plurality of TCI states associated with corresponding second indexes, wherein the first plurality of TCI states are indicated using the second indexes.

22. The UE of claim 21, wherein a single index of the second indexes is associated with the first plurality of TCI states.

23. The UE of claim 22, wherein when the single index is updated to be associated with another one or more TCI states, the first CSI-RS resource is updated to be associated with the other one or more TCI states.

24. The UE of claim 19, wherein the at least one receive parameter comprises at least one of at least one receive beam, a precoding, a rank, or a channel quality indicator.

25. A transmitter comprising:
a memory; and
a processor coupled to the memory, wherein the memory and the processor are configured to:
transmit, to a user equipment (UE), a configuration of one or more channel state information reference signal (CSI-RS) triggering states, wherein a first CSI-RS triggering state of the one or more CSI-RS triggering states indicates a CSI-RS resource set and associated transmission configuration indication (TCI) states, the CSI-RS resource set comprising a plurality of CSI-RS resources, each CSI-RS resource of the plurality of CSI-RS resources associated with one or more corresponding TCI states as indicated by the first CSI-RS triggering state, wherein a first CSI-RS resource of the plurality of CSI-RS resources is associated with a first plurality of TCI states as indicated by the first CSI-RS triggering state;
transmit, to the UE, a trigger for measurement of CSI-RS, the trigger indicating the first CSI-RS triggering state;
transmit, to the UE, an indication of the first plurality of TCI states as associated with a downlink transmission; and
transmit, to the UE, the downlink transmission for the UE to receive using at least one receive parameter determined based on the indication of the first plurality of TCI states and the first plurality of TCI states being associated with the at least one receive parameter.

26. The transmitter of claim 25, wherein the memory and the processor are further configured to:
transmit a configuration of a plurality of TCI states associated with corresponding first indexes; and
transmit a configuration of activation of a subset of the plurality of TCI states associated with corresponding second indexes, wherein the first plurality of TCI states are indicated using the first indexes.

27. The transmitter of claim 25, wherein the memory and the processor are further configured to:
transmit a configuration of a plurality of TCI states associated with corresponding first indexes; and
transmit a configuration of activation of a subset of the plurality of TCI states associated with corresponding second indexes, wherein the first plurality of TCI states are indicated using the second indexes.

28. The transmitter of claim 27, wherein a single index of the second indexes is associated with the first plurality of TCI states.

29. The transmitter of claim 28, wherein when the single index is updated to be associated with another one or more TCI states, the first CSI-RS resource is updated to be associated with the other one or more TCI states.

30. The transmitter of claim 25, wherein the one or more receive parameters comprise one or more of one or more receive beams, a precoding, a rank, or a channel quality indicator.

* * * * *